April 16, 1946.  C. M. COOPER  2,398,345
GAS SCRUBBING APPARATUS
Filed Feb. 12, 1944  3 Sheets-Sheet 1

Charles M. Cooper INVENTOR.

BY
ATTORNEY

April 16, 1946.   C. M. COOPER   2,398,345
GAS SCRUBBING APPARATUS
Filed Feb. 12, 1944   3 Sheets-Sheet 2

Charles M. Cooper   INVENTOR.

BY

ATTORNEY

April 16, 1946. C. M. COOPER 2,398,345
GAS SCRUBBING APPARATUS
Filed Feb. 12, 1944 3 Sheets-Sheet 3

Charles M. Cooper INVENTOR.
BY [signature]
ATTORNEY

Patented Apr. 16, 1946

2,398,345

UNITED STATES PATENT OFFICE 2,398,345

GAS-SCRUBBING APPARATUS

Charles M. Cooper, Chicago, Ill., assignor to E. I. du Pont de Nemours & Company, Wilmington, Del., a corporation of Delaware Application February 12, 1944, Serial No. 522,040

4 Claims. (Cl. 261—108)

This invention relates to an apparatus for transfer of constituents between vapor or a gas and a liquid and more particularly to an improved apparatus for scrubbing gases with water.

The ratio of gas to liquid volumes met with in industrial practice ranges from around 0.5:1 up to 500:1 or even higher. When a very low ratio such as 2:1 is required, it becomes difficult, if not impossible, to design equipment which will handle, in a practicable size of equipment, the large liquid flows required per unit of gas flow and at the same time provide efficient contacting.

It is an object of this invention to overcome the disadvantages of the prior art, to reduce the effect of factors interfering with true countercurrent action, and to provide an efficient apparatus for transferring a constituent between a gas and a liquid under conditions wherein the ratio of volume of gas to volume of liquid is less than 20 to 1.

It is another object of the present invention to provide an apparatus for gas scrubbing involving adequate contact surfaces, together with adequate agitation of gas and liquid phases.

It is a further object of the present invention to provide a new and improved apparatus for transferring constituents between gas and liquid in which entrainment of liquid in gas and carry-down of gas in liquid are minimized.

Another object of this invention is to provide an apparatus whereby higher rates of gas flow and/or lower pressure drops will be possible in a given scrubbing tower than can be accomplished by the prior art when carrying out the same degree of transfer between phases.

Other objects and advantages of the present invention will be apparent from the following description in which the preferred details and embodiments of the invention are set forth.

According to the present invention the above objects are attained by carrying on countercurrent contacting of gas and liquid in such a way that a freely falling continuous stream of liquid is caused to fall through a gas or vapor into a pool of the liquid, entraining and carrying into the pool part or all of the gas, followed by removing the resultant entrained gas from the pool.

It is known that when a stream of liquid falls through a gas or vapor into a pool, gas or vapor may be carried as bubbles beneath the surface of the pool. I have discovered that the quantity of such entrained gas or vapor is roughly proportional to the height of fall of liquid. I have also discovered that, when a stream of liquid freely falls for a vertical distance of two to three feet through a gas or vapor into a pool of a liquid, approximately one volume of gas or vapor will be carried into the pool per volume of falling liquid, and the greater the height of fall, the greater the relative amount of gas or vapor so entrained. I have further discovered that when the liquid is caused to fall into a pool the gas is carried into the pool in the form of fine bubbles and into contact with highly turbulent liquid, thus providing a greatly extended surface under excellent conditions for contact between the liquid and gas or vapor. In this manner, highly efficient scrubbing of the gas or vapor is made possible with exceedingly pronounced agitation and with a low pressure drop in the gas flowing through the apparatus in which the liquid-gas contacting takes place. For maximum agitation and contact between gas and liquid, the depth of the pool into which the freely falling stream of liquid falls should be at least one-fourth the height of fall.

After the gas or vapor is scrubbed in the pool, it rises to the surface and is removed, preferably by being passed on toward the exit of the tower in which the scrubbing is effected, from whence it may be withdrawn as a purified gas. The water or other liquid which has been used as a scrubbing medium may be constantly removed from the bottom of the tower and replenished with fresh scrubbing liquid so that a continuous scrubbing, or removal, of constituent from the gas phase is maintained.

A more comprehensive understanding of the invention will be obtained from a consideration of the drawings in the figures of which like numbers designate equivalent parts throughout.

Figure 1 diagrammatically illustrates a cross section through a preferred type of apparatus showing several elements and likewise showing structure whereby the flow of gas and liquid are controlled.

Figure 1:
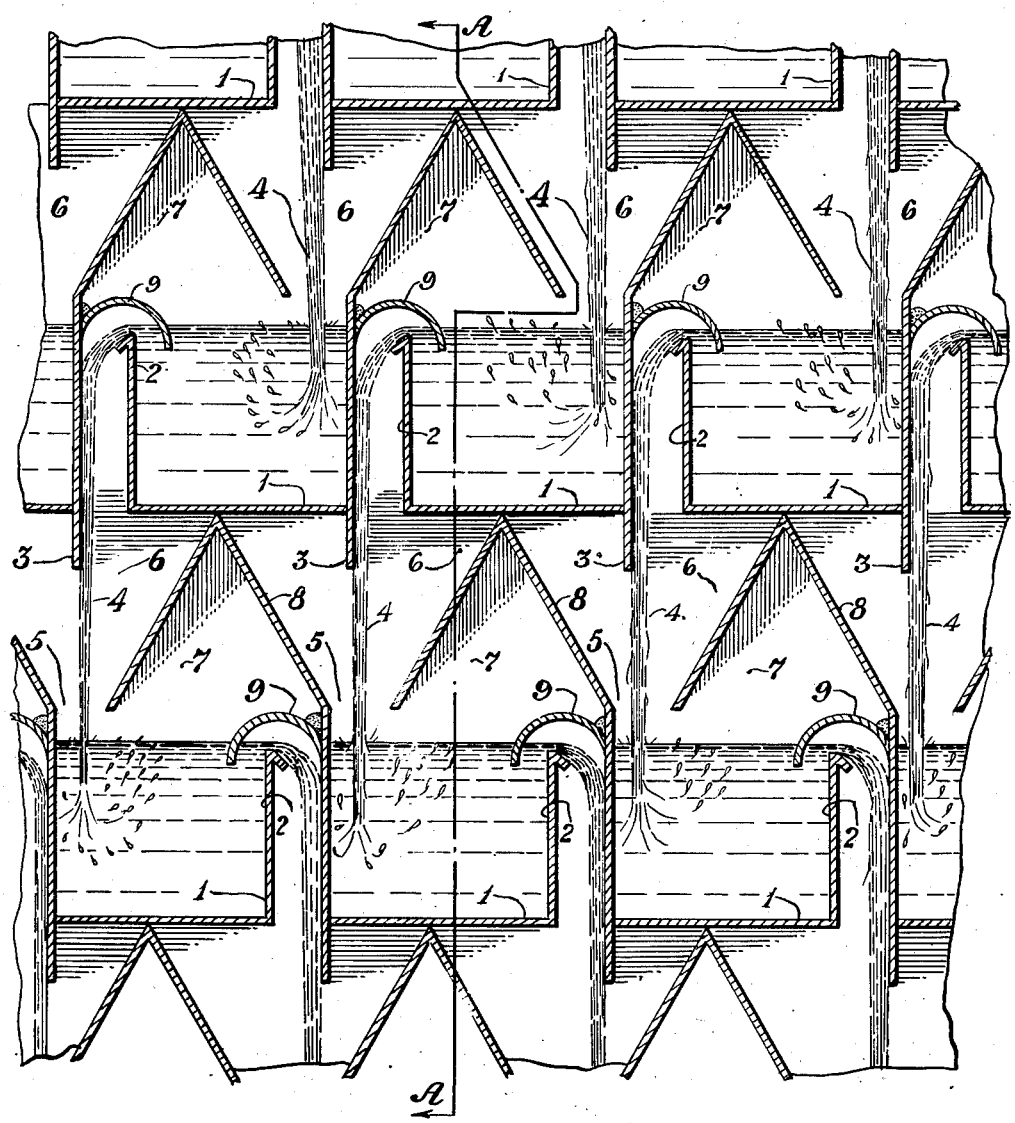

With reference to Figure 1, rectangular chambers 1 are provided, filled with water (or other absorbing liquid). These rectangular chambers 1 are positioned side by side in the same horizontal plane, or tier, and are shown in Figure 1 as 1. A plurality of tiers of these chambers are provided. The water flows from the pool in, for example, chamber 1 over a weir 2; preferably provided with a lip to direct the flow of water. After passing weir 2 the water impinges upon the back wall of an adjacent chamber, and is directed downwardly as a sheet 4 along the wall which extends by means of a lip 3 below the bottom of chamber 1. The lip 3 directs and guides the falling sheet 4 of water in a continuous and compact stream directly into the pool of chamber 1 positioned below chamber 1. The lip 3 performs an important function in compacting the falling film 4 of water, thus preventing it from dispersing in small droplets and thereby lowering its effective gas carrying capacity.

The falling film of water 4 flows as has been stated into the vessel 1 positioned in such a way that the opening 5 of the vessel permits the sheet of water 4 to flow into the pool without substantial contact with any structural part. The space 6, located around the falling sheet of water 4 as it leaves the top of the weir 2 and passes into the pool below is charged with the gas to be scrubbed. The falling sheet of water 4 carries with itself into the pool the gas which is continuously charged into the space 6. This space 6 characterized as the gas absorbing space is supplied with the gas flowing into the space 6 from the back which is open.

The falling sheet of water 4 carrying with it the gas from the absorbing space 6 plunges into the pool in chamber 1 wherein the gas is scrubbed and the unabsorbed gas passes from the pool into the scrubbed gas space 7. This space is enclosed by a hood 8 which prevents contact between the scrubbed gas in space 7 and the unscrubbed gas in space 6, the scrubbed gas in space 7a flowing toward the reader, the back of said space away from the reader being closed. There is a passage from space 7 into the gas absorbing spaces 6, 6b', etc. of the next higher tier wherein the scrubbed gas from space 7 passes to spaces 6 and is again carried by the falling sheets of water 4 into the higher tier of pools 1. Thus, the scrubbing is continued in each succeeding tier, the tiers of scrubbers above, scrubbing the gas which has already been scrubbed in the tiers below. The concentration of the scrubbing liquid increases therefore as it passes downwardly through the apparatus. Conversely as the gas passes upwardly through the apparatus it becomes less and less concentrated in the gas which is extracted during the scrubbing operation.

Over each weir there is provided a cap 9 which prevents the scrubbed gas in space 7 from passing along with the downwardly falling sheet 4 into the gas scrubbing space 6 of the lower tier. This cap 9 is preferably constructed in such a way that the extremity dipping into the liquid is slightly below the top of weir 2 in order to insure no air space between the surface of the liquid in the pool with the space 6 in the tier below.

One difference between the adjacent tiers is that the scrubbed gas areas 7 of one tier is open at the back, the gas flowing, therefore, from this area away from the reader and passing upwardly by means more fully particularized hereinafter to the upward tiers wherein the scrubbed gas areas 7 are open at the front.

It will be noted that the lower (unprimed) tier may be considered a right hand series of chambers while the upper complete tier may be considered a left hand series of chambers, this alternate system advantageously providing a compact arrangement whereby the liquid flowing downwardly through the scrubbing apparatus does not pass from one extreme side of the apparatus to the other extreme side of the apparatus but flows substantially in a straight line, downwardly through the chamber, except for the variation in the width of each pool. Other arrangements may be used if desired to provide other methods of flow without departing from the scope of the invention.

Figure 2:
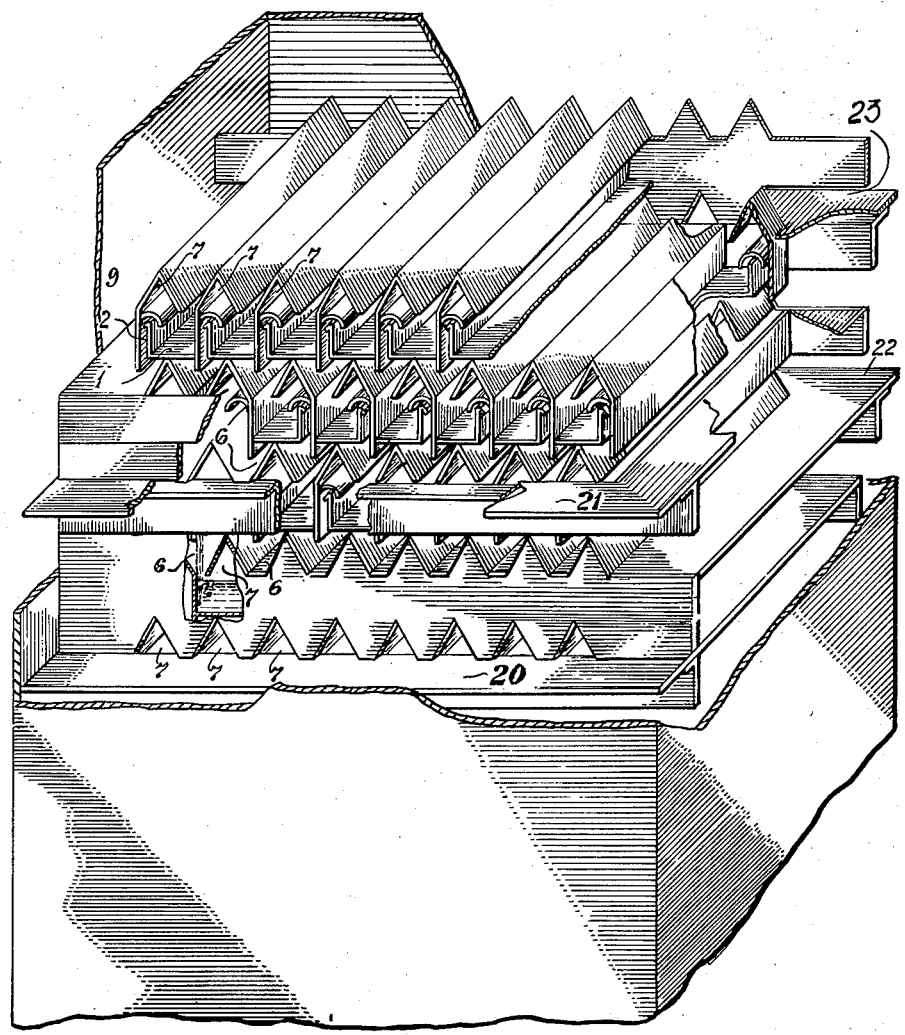
Figure 2 is an isometric drawing of a rectangular tower containing applicant's absorbing gas entraining structure with portions cut away to reveal details of construction.

By reference to Figure 2 it will be noted that the gas flowing from the first tier of absorbed gas spaces 7 flows into the space provided at the front of the tier and by means of the baffles 20 is forced to pass into the gas scrubbing area 6 wherein the gas is scrubbed. The gas in the gas scrubbing area 6 passes into the liquid pool 1 (see Fig. 1), from the pool into the scrubbed gas areas 7, the front ends of which are closed, the back ends of which, however, are open. The thus scrubbed gas from areas 7 pass from the back face of the tower and are forced by means of baffles 20 to flow into the next upper tier of gas absorbing space 6.

Figure 2 illustrates a rectangular type of scrubbing tower but it will be understood that a cylindrical, oval or other shaped tower may be employed if desired by merely changing the shape of the baffles 20 and the like between the various sections of the scrubbing apparatus in order that the gas will flow in the manner as indicated in Figure 2 from a lower space 7 wherein it issues from the scrubbing liquid into an upper space 6 wherein it is entrapped and again forced into the scrubbing liquid.

Figure 3:
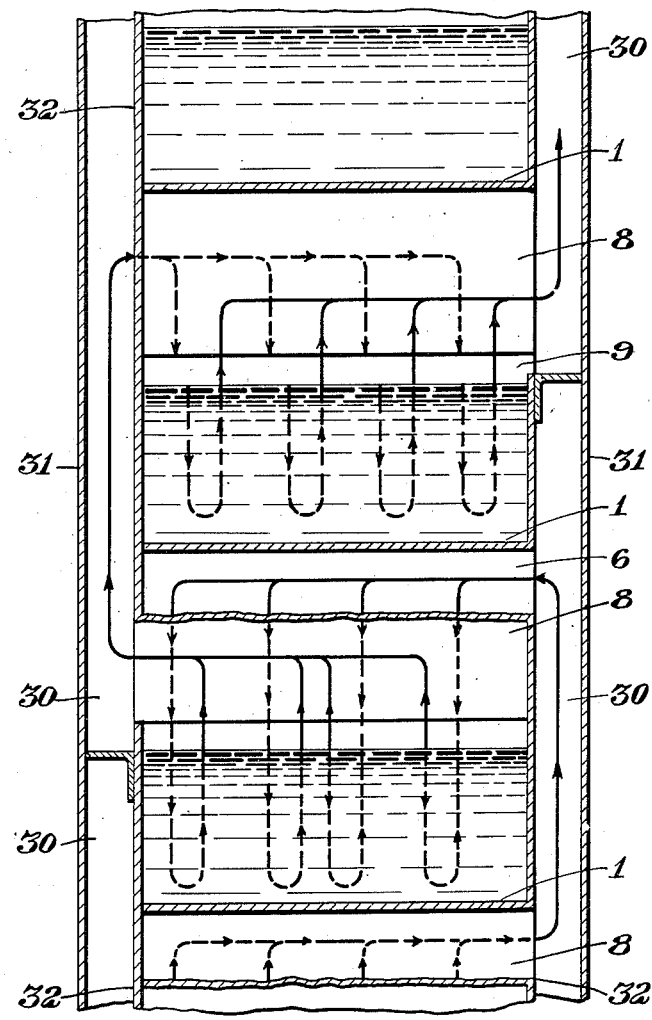
Fig. 3 is a cross sectional elevation along line A—A of Fig. 1 taken in the direction indicated by the arrow of that figure.

Fig. 3 is a cross section of the apparatus as diagrammatically illustrated in Fig. 1 which cross section is taken along the line A—A of Fig. 1 and in the direction indicated. With special reference to Fig. 3, the gas being purified passes upwardly through conduits 30 from one tier of receptacles to another, the gas flowing with the arrows. The conduits 30 are circumscribed by the outer walls 31, and the inner walls 32. The gas purified by scrubbing in the lowest compartment passes from under the lowest hood 8, into the right-hand lower passage 30, and flows upwardly into the space 6, above the middle hood 8. The gas in this space is entrapped by the falling sheet of water 4 (see Fig. 1), and passes downwardly with that sheet into the lower pool in receptacle 1. The partially purified gases pass upwardly out of this pool under the center hood 8, and into the left-hand upper passage 30, from which it passes into the space 6 (see Fig. 1) behind the top hood 8. This gas is entrapped by a falling sheet of water and passes into a pool (see Fig. 1) behind the center pool of Fig. 3. The gas passing into the center pool of Fig. 3 comes from space 6, in the tier toward the reader (see Fig. 1), is forced into the center pool in receptacle 1, by a falling sheet of scrubbing liquid, the thus more highly purified gases passing from the center pool under the top hood 8, and out into the upper, right-hand conduit 30, to the next series of receptacles above.

Although not necessary for successful operation according to this invention, for greatest efficiency according to the preferred embodiments of the invention, the following factors should be observed:

(1) The depth of pool into which the stream falls with its entrained gas should, for best results, for any given height of fall, exceed a fairly definite minimum value. Thus, for a 34 inch fall, the liquid depth in the pool should be at least 8 inches and preferably somewhat greater. Generally speaking, for best results, the depth of the pool should be at least one-fourth the height of the liquid fall.

(2) The liquid fall should be directed to provide a continuous or concentrated stream or streams instead of a diffused rain of individual droplets. Although 300-500 gallons per minute or more may be used, I find that lower rates, i. e. a volume ratio per stream of the order of not more than 300 gallons or less per minute per horizontal foot along the falling stream of the liquid gives good results. It is highly desirable that the stream fall freely through the gas, since, for example, if it is allowed to flow smoothly down a vertical wall which extends beneath the surface of the pool, little or no entrainment of the gas in the liquid will result. Inasmuch as the greater share of the agitation and contacting of gas and liquid take place in the pool, the reduction in entrainment of gas and liquid caused when the liquid is allowed to flow smoothly down a vertical wall detracts greatly from the efficiency of the process.

(3) For efficiency and economy in operation, a tower should be employed in which the liquid is caused to flow from one pool downwardly, in a given column, to a series of other pools which are arranged below the topmost pool so that the effect is one of a cascade, the liquid flowing from one pool downwardly to another pool through gas or vapor which is being passed between, although perpendicularly to, the flow of the falling streams. It is desirable in such a case that the gas bubbles entrained by the falling stream in any one of the cascades should not be carried on downwardly to the gas space or pool below.

(4) Gas rising from the pool after being entrained by the falling stream should not be allowed to mix extensively with the gas which is about to be entrained, and (5) It is desirable that carrydown of gas from a plate to the one below it be prevented or at least minimized.

The maximum liquid rate for best operation, according to the most efficient methods of this invention in this specific application, is of the order of 300 gallons per minute per horizontal foot. Generally speaking, preferred operation is carried on with a fall of 75 to 150 gallons per minute or less per horizontal foot of falling stream. However, this simple form of cascade is highly effective provided adequate pool depth is employed, and provided the water or liquid per horizontal foot of falling stream is in the neighborhood of 300 gallons per minute or less.

The changes to be made in gas and in liquid compositions together with flow rates and the solubility of the gas in the liquid determine the number of separate stages employed in any given tower. Thus, when absorbing a soluble gas in a liquid, if the quantity of liquid which may be used for scrubbing, per unit of gas or vapor, is relatively without limit, only a few countercurrent cascade stages need be employed to transfer a given fraction of the soluble constituent from one phase to the other. On the other hand, if it is desired to work toward complete saturation of the liquid with the constituent which is being removed from the gas, and at the same time remove the bulk of the constituent from the gas, a greater number of cascades could be utilized.

Various changes may be made in the details and preferred embodiments of this invention without departing therefrom or sacrificing any of the advantages thereof.

I claim:

1. In scrubbing apparatus of the class described wherein a gas is scrubbed by a liquid comprising in combination a tower, a plurality of receptacles arranged in superposed tiers in the tower, and adapted to hold a pool of liquid into which the gas is forced by liquid falling into the pool, a weir forming one side of each receptacle over which the liquid in the pool overflows, a hood over the weir for collecting the scrubbed gas as it is discharged from the pool, a cap over the weir adapted to prevent the flow of gas over the weir, a wall constituting one side of an adjacent receptacle spaced from the weir to permit and to direct the flow of liquid from the weir, the receptacles so positioned in each tier that the flow of liquid from an upper receptacle is directed into the pool of liquid positioned below it.

2. In scrubbing apparatus of the class described wherein a gas is scrubbed by a liquid comprising in combination a tower, a plurality of receptacles of rectangular cross section arranged in superposed tiers in the tower, and adapted to hold a pool of liquid into which the gas is forced by liquid falling into the pool, a weir forming one side of each receptacle for the overflow of liquid from the receptacle, a hood over the weir and a major portion of the pool for collecting the scrubbed gas issuing from the pool, a cap over the weir and extending into the pool adapted to prevent the flow of gas past the weir, a wall constituting one side of an adjacent receptacle spaced from the weir to permit and direct the flow of liquid from the weir, and an extension of said latter wall below the base of the receptacle to direct the flow of liquid in a continuous directed sheet of liquid, the receptacles so positioned that the flow of liquid from an upper receptacle is directed into the pool of liquid positioned below it.

3. In scrubbing apparatus of the class described wherein a gas is scrubbed by a liquid comprising in combination a tower, a plurality of receptacles arranged in superposed tiers in the tower, and adapted to hold a pool of liquid into which the gas is forced by liquid falling into the pool, a weir forming one side of each receptacle over which the liquid in the pool overflows, a hood over the weir for collecting the scrubbed gas, a cap over the weir adapted to prevent the flow of gas over the weir, a wall constituting one side of an adjacent receptacle spaced from the weir to permit and to direct the flow of liquid from the weir, the receptacles so positioned in each tier that the flow of liquid from an upper receptacle is directed into the pool of liquid positioned below it, and baffle plates between the tiers to direct the flow of the gases being scrubbed from one tier to another.

4. In scrubbing apparatus of the class described wherein a gas is scrubbed by a liquid comprising in combination a tower, a plurality of receptacles of rectangular cross section arranged in superposed tiers in the tower, and adapted to hold a pool of liquid into which the gas is forced by liquid falling into the pool, a weir forming one side of each receptacle for the overflow of liquid from the receptacle, a hood over the weir and a major portion of the pool for collecting the scrubbed gas issuing from the pool, a cap over the weir and extending into the pool adapted to prevent the flow of gas past the weir, a wall constituting one side of an adjacent receptacle spaced from the weir to permit and direct the flow of liquid from the weir, and an extension of said latter wall below the base of the receptacle to direct the flow of liquid in a continuous directed sheet of liquid, the receptacles so positioned that the flow of liquid from an upper receptacle is directed into the pool of liquid positioned below it, baffle plates between the tiers alternately extending from each tier to the wall of the tower to direct the flow of the gases being scrubbed from one tier to another, the hood over each receptacle being closed at one end and opened at the other whereby the gases collected under said hoods pass into the tiers above for further scrubbing.

CHARLES M. COOPER.